J. H. ALEXANDER.
Process of Refining Petroleum, &c.
No. 229,297.  Patented June 29, 1880.
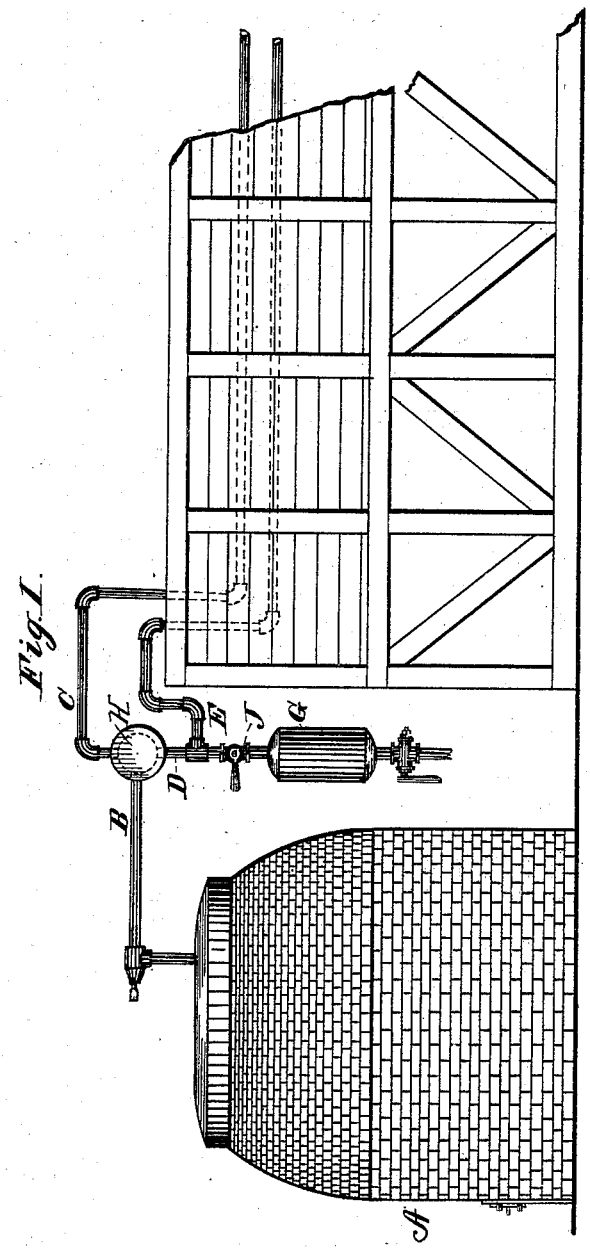

J. H. ALEXANDER.
Process of Refining Petroleum, &c.
No. 229,297.   Patented June 29, 1880.
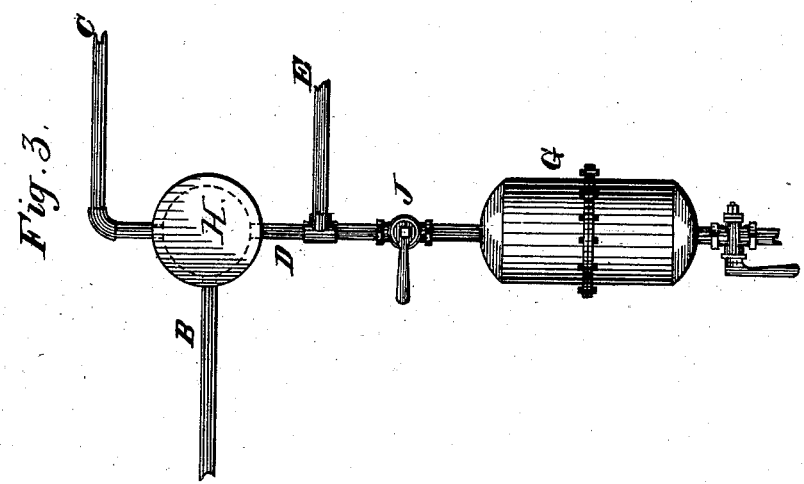
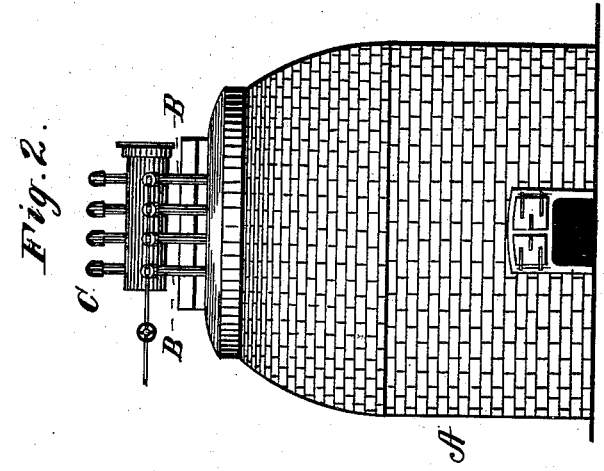
Witnesses:
Wm. L. Lay,
W. R. Edelen.
Inventor:
James H. Alexander.
By his attorney,
James C. Boyce.

United States Patent Office.

JAMES H. ALEXANDER, OF OIL CITY, PENNSYLVANIA.

PROCESS OF REFINING PETROLEUM, &c.

SPECIFICATION forming part of Letters Patent No. 229,297, dated June 29, 1880.

Application filed March 1, 1879.

*To all whom it may concern:*

Be it known that I, JAMES H. ALEXANDER, of Oil City, in the county of Venango and State of Pennsylvania, have invented certain new and useful Improvements in the Art of Refining Petroleum-Tar and Similar Substances; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a general side view of a still and part of the worms connected therewith, with the means recommended by me attached thereto. Fig. 2 is an end view of the still; and Fig. 3 is an enlarged view of the additions which I make to the ordinary arrangement, in order to give better effect to my invention.

My improvement is applicable to the refining of any substances from which separate products of different gravities are obtainable, such as rosin, coal-tar, cotton-seed oil, paraffine, paraffine-oil, the tar from petroleum, and similar substances.

As the principle is the same in all, I shall describe my invention as applied to the distillation of the tar from petroleum.

A is a tar-still of the ordinary construction, which is filled with tar and heated in any suitable manner. The vapors evolved pass out from the still by the pipe B, and usually are conducted into worms surrounded by cold water, and thus condensed into liquid. The product will vary in gravity from the very lightest and most inflammable down by gradual degrees to a thick and gummy substance which is solid when cold.

Heretofore the way of dividing the product has been by testing the liquid from time to time as it runs from the worms, and when its gravity is found to have reached a certain degree the stream is then turned into a receptacle different from that in which the first of the run was received.

The gases may themselves be separated in two or more divisions by their own gravity before their condensation, and after condensation in separate condensers the resulting liquids will show a marked difference in their specific gravity and in their inflammability, and liquids of low gravities obtained by my improvement will be much less inflammable than liquids of the same gravity obtained by the usual process.

In making a practical use of this fact I use such an arrangement of tubes that the vapors will themselves divide into higher and lower gravities, and I convey each gas to a separate worm, and the gum to its own receptacle.

To the outlet-pipe B, I attach two pipes, C and D, one of which, C, I lead upward, and the other, D, downward, from a common head or gas-drum, H, and to each of said pipes I join a worm of the ordinary construction.

The vapors evolved from the still A will pass through the outlet-pipe B to the fork and will then separate. The lighter and more volatile will pass into the pipe C, while the heavier will descend the pipe D and through the pipe E to the worm.

In order to better effect the separation of the gases I place the gas-drum H at the end of the pipe B and connect the pipes D and C therewith. This gas-drum H is a single-celled chamber, wherein the vapors may separate according to gravity, and should be devoid of shelves or other obstructions which would tend to condense the vapors, as the end to be obtained is a separation of the gases or vapors before condensation, whereby uniform products will be obtained.

The pipe C may be further divided in the same manner, and a similar drum placed at the bifurcation, and thus I may obtain three grades of oil products. In a similar way even a greater number of products might be obtained from one still.

During the first of the run, while light gases are being evolved, the connection with the gum-drum G may be closed; but when the liquid from the worm E (being tested from time to time) is down to 12° Baumé, or thereabout, the stop-cock J should be opened and the gum, which will then or soon thereafter commence to distill over, will drop into the gum-drum G.

The relative size of the still and drums cannot be absolutely fixed, nor are they important, but I recommend drums of about one-barrel capacity each to tar-stills of about fifteen-barrels capacity.

Steam-pipes may be connected with the drums, so that steam may be employed to warm or clean the drums or pipes, or for admixture with the gases.

The gum-drum G may be made in two parts bolted together, as shown in Fig. 3, or in any other way, so it can be opened for cleaning. Both of the drums may be made of such shapes as to connect with the different outlet-pipes from one still or those from several stills, where such connection may be convenient.

I do not limit myself to any shape or size of drums, nor to any exact location thereof, nor to any particular angle of ascent or descent of the branches of the outlet-pipe.

I claim as new—

1. The method herein described of separating the products of distillation into several grades, which consists in conducting the vapors from the still into a common receptacle wherein the vapors are allowed to separate, as such, by their own gravities, and then conducting them, according to their gravities, to separate condensing-worms, substantially as and for the purpose specified.

2. The method herein described of separating the products of distillation into several grades, which consists in conducting the vapors from the still to a common receptacle wherein the vapors are allowed to separate, as such, by their own gravity, and the gummy matter is allowed to deposit, the vapors of different gravities being conducted thence to separate condensers, and the gummy matter to a receptacle therefor, substantially as and for the purpose specified.

3. The combination, with an oil-still, of a single-cell chamber or receptacle connected with the goose-neck or vapor-pipe of the still, wherein the vapors may separate according to gravity, two or more pipes leading from said chamber to separate condensers, and a gum-receptacle, the gum-pipe thereof connected directly to the single-cell gas-separating chamber, substantially as and for the purpose specified.

In testimony that I claim the foregoing as my own I affix my signature in presence of two witnesses.

JAMES H. ALEXANDER.

Witnesses:
JAMES C. BRYCE,
W. R. EDELEN.